(12) United States Patent
Twitchell, Jr.

(10) Patent No.: US 6,745,027 B2
(45) Date of Patent: Jun. 1, 2004

(54) CLASS SWITCHED NETWORKS FOR TRACKING ARTICLES

(75) Inventor: Robert W. Twitchell, Jr., Suwanee, GA (US)

(73) Assignee: Seekernet Incorporated, Suwanee, GA (US)

( * ) Notice: Subject to any disclaimer, the term of this patent is extended or adjusted under 35 U.S.C. 154(b) by 361 days.

(21) Appl. No.: 09/681,282

(22) Filed: Mar. 13, 2001

(65) Prior Publication Data

US 2002/0119770 A1 Aug. 29, 2002

Related U.S. Application Data

(60) Provisional application No. 60/257,637, filed on Dec. 22, 2000.

(51) Int. Cl.[7] .................................................. H04Q 7/20
(52) U.S. Cl. .................... 455/422.1; 455/449; 455/517; 455/500; 455/435.1; 455/466; 455/456.1; 342/457; 342/463
(58) Field of Search ...................... 455/422.1, 11.1, 455/449, 517, 500, 435.1, 522, 466, 456.1; 342/457, 463

(56) References Cited

U.S. PATENT DOCUMENTS

| | | | |
|---|---|---|---|
| 5,040,238 A | 8/1991 | Comroe et al. ............... 455/33 |
| 5,117,501 A | 5/1992 | Childress et al. ........... 455/11.1 |
| 5,129,096 A | 7/1992 | Burns .......................... 455/18 |
| 5,295,154 A | 3/1994 | Meier et al. ................... 375/1 |
| 5,331,637 A | 7/1994 | Francis et al. ................ 370/54 |
| 5,369,784 A | 11/1994 | Nelson ....................... 455/51.2 |
| 5,425,051 A | 6/1995 | Mahany ...................... 375/202 |
| 5,442,758 A | 8/1995 | Slingwine et al. .......... 395/375 |
| 5,511,232 A | 4/1996 | O'Dea et al. ............... 455/54.1 |
| 5,604,892 A | 2/1997 | Nuttall et al. ............... 395/500 |
| 5,652,751 A | 7/1997 | Sharony .................... 370/227 |
| 5,682,379 A | * 10/1997 | Mahany et al. ............. 370/311 |
| 5,761,195 A | * 6/1998 | Lu et al. ..................... 370/329 |
| 5,890,054 A | * 3/1999 | Logsdon et al. ........... 455/11.1 |
| 5,907,491 A | * 5/1999 | Canada et al. ......... 364/468.15 |
| 5,917,423 A | * 6/1999 | Duvall .................. 340/825.37 |
| 5,950,124 A | * 9/1999 | Trompower et al. ........ 455/422 |

(List continued on next page.)

FOREIGN PATENT DOCUMENTS

| WO | WO 00/68907 | 11/2000 |
|---|---|---|

OTHER PUBLICATIONS

Publication No. US 2001/0000019 A1, Publication Date Mar. 15, 2001, Bowers et al.

(List continued on next page.)

Primary Examiner—Nay Maung
Assistant Examiner—Sujatha Sharma
(74) Attorney, Agent, or Firm—Morris, Manning & Martin, LLP

(57) ABSTRACT

A method of forming an ad hoc hierarchical communication network involves associating a plurality of wireless transceivers with articles, and assigning to each of the transceivers a class designation representative of a characteristic or behavior of the article with which the transceiver is associated. A network organization routine of the wireless transceivers operates to establish the hierarchical network based on the transceivers' class designations, resulting in a logical network organization that provides efficiencies for asset tracking. Each wireless transceiver's class designation is used by a digital processor of the wireless transceiver to selectively receive packets intended for receipt by transceivers of the same class. The class-based network reduces power consumption and signal interference, which increases battery life in the wireless transceivers. The wireless transceivers may include a query handling routine in communication with a memory of the transceiver for serving as a dynamic distributed hierarchical database system.

43 Claims, 11 Drawing Sheets

U.S. PATENT DOCUMENTS

| | | | | |
|---|---|---|---|---|
| 5,974,236 | A | * 10/1999 | Sherman | 395/200.51 |
| 6,005,884 | A | * 12/1999 | Cook et al. | 375/202 |
| 6,006,100 | A | * 12/1999 | Koenck et al. | 455/466 |
| 6,078,789 | A | * 6/2000 | Bodenmann et al. | 455/41.2 |
| 6,091,724 | A | * 7/2000 | Chandra et al. | 370/390 |
| 6,097,707 | A | * 8/2000 | Hodzic et al. | 370/321 |
| 6,125,306 | A | 9/2000 | Shimada et al. | |
| 6,127,976 | A | 10/2000 | Boyd et al. | 342/463 |
| 6,134,587 | A | 10/2000 | Okanoue | 709/222 |
| 6,192,400 | B1 | * 2/2001 | Hanson et al. | 709/217 |
| 6,201,974 | B1 | 3/2001 | Lietsalmi et al. | |
| 6,313,745 | B1 | 11/2001 | Suzuki | |
| 6,354,493 | B1 | * 3/2002 | Mon | 235/380 |
| 6,381,467 | B1 | * 4/2002 | Hill et al. | 455/519 |
| 6,405,102 | B1 | 6/2002 | Swartz et al. | |
| 6,409,082 | B1 | * 6/2002 | Davis et al. | 235/385 |
| 6,418,299 | B1 | 7/2002 | Ramanathan | |
| 6,427,913 | B1 | * 8/2002 | Maloney | 235/383 |
| 6,547,137 | B1 | * 4/2003 | Begelfer et al. | 235/385 |
| 6,600,418 | B2 | * 7/2003 | Sainati et al. | 340/572.1 |
| 6,614,349 | B1 | * 9/2003 | Proctor et al. | 340/572.1 |

OTHER PUBLICATIONS

Charles E. Perkins, AD HOC Networks, Jan. 2001, table of contents, chapters 1, 4 and 11.

Ram Ramanathan et al., Hierarchically–Organized, Multi–hop Mobile Wireless Networks for Quality–of–Service Support, pp. 1–35, 1998.

Guangyu Pei et al., Mobility Management in Hierarchical Multi–hop Mobile Wireless Networks, 6 pages, 1999.

Http://www/iprg.nokia.com/~charliep/txt/manet/term.txt, Mobile Ad Hoc Networking Terminology, C. Perkins, Nov. 17, 1998, visited Nov. 13, 2000.*

Daniel Lihui Gu et al., C–ICAMA, A Centralized Intelligent Channel Assigned Multiple Access for Multi–Layer Ad–Hoc Wireless Networks with UAVs , 6 pages, 2000.*

Daniel Lihui Gu et al., Hierarchical Routiing for Multi–Layer Ad–Hoc Wireless Networks with UAVs, 5 pages, 2000.*

Atsushi Iwata, et al., Scalable Routing Strategies for Ad Hoc Wireless Networks, 1999, pp. 1–26,.

Http://www.cs.ucla.edu/NRL/wireless/PAPER/draft–ietf–manet–admrp–02.txt, On–Demand Multicast Routing Protocol (ODMRP) for Ad Hoc Networks, Jan. 2000, visited Nov. 13, 2000.

Guangyu Pei, et al., A Wireless Hierarchical Routing Protocol with Group Mobility, 1999, 5 pages.

Http://sameh.html+22link+allocation%22+(network+or+networks)+)wireless+or+mobile)&hl, Self–Configuration of a Wireless ad–hoc Network, visited Nov. 13, 2000.

J.J. Garcia–Luna–Aceves et al., Source–Tree Routing in Wireless Networks, 1999, 10 pages.

Jean–Pierre Hubaux et al., Toward Self–Organized Mobile Ad Hoc Networks: The Terminodes Project, IEEE Communications Magazine, Jan. 2001.

Jaap Haartsen et al., Bluetooth: Vision, Goals, and Architecture, Mobile Computing and Communications Review, vol. 1, No. 2 1998.

Jaap Haartsen, Bluetooth—The Universal Radio Interface for Ah Hoc, Wireless Connectivity, Ericsson Review No. 3, pp. 110–117, 1998.

Ezio Valdevit, Cascading in Fibre Channel: How to Build a Multi–Switch Fabric, pp. 1–12.

* cited by examiner

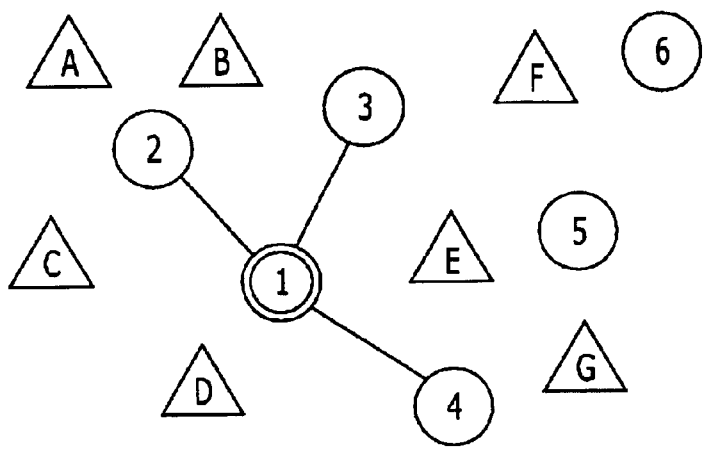
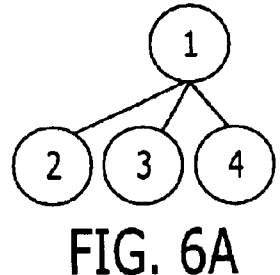
FIG. 6
FIG. 6A
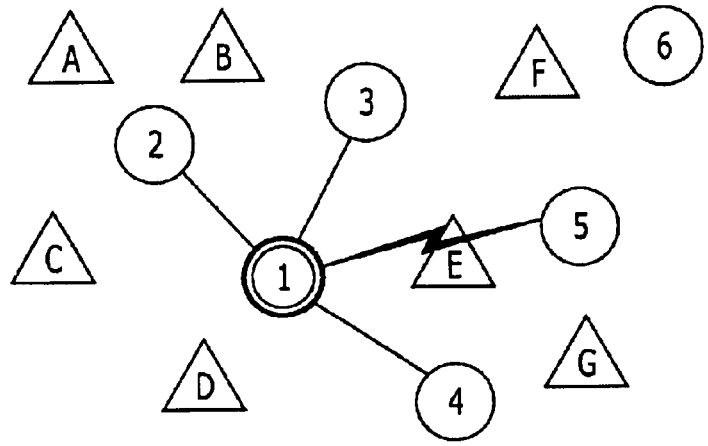
FIG. 7
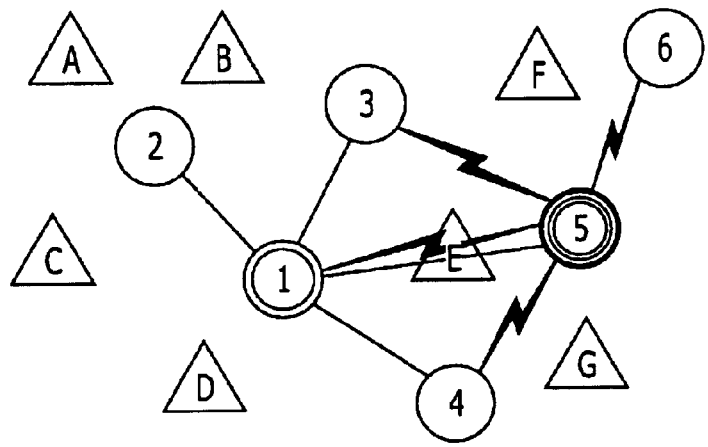
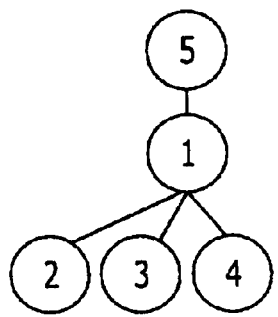
FIG. 8
FIG. 8A

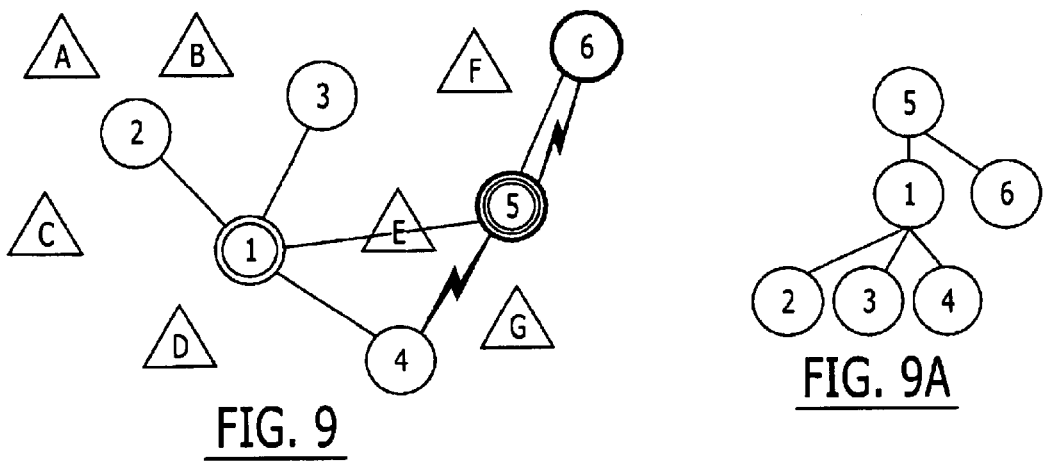
FIG. 9
FIG. 9A
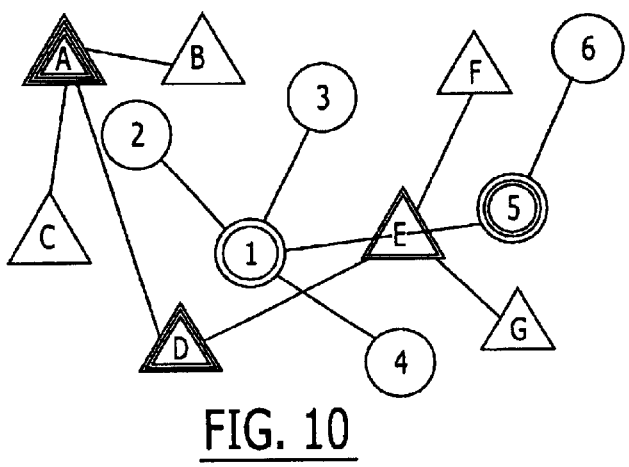
FIG. 10
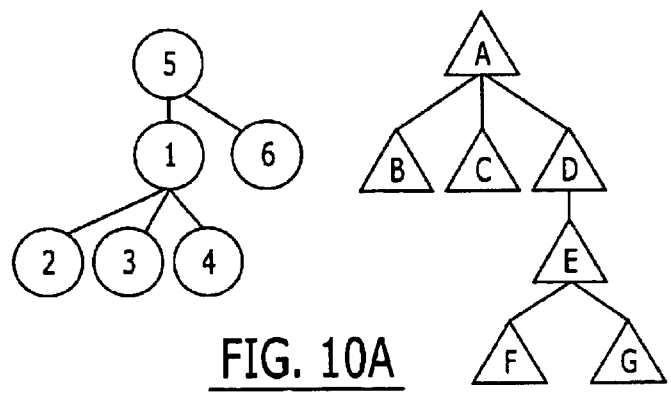
FIG. 10A

CLASS SWITCHED NETWORKS FOR TRACKING ARTICLES

CROSS REFERENCE TO RELATED APPLICATIONS

This application claims the benefit of U.S. Provisional Patent Application No. 60/257,637, filed Dec. 22, 2000 now abandoned.

COPYRIGHT NOTICE

© 2001 Intransit Networks, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71 (e).

INTRODUCTION

TECHNICAL FIELD

The present invention relates to methods of forming ad hoc data communication networks and distributed databases and, in particular, to methods of dynamic self-organization of wireless transceivers based on classes of articles associated with the wireless transceivers to form hierarchical ad hoc wireless data communication networks and distributed databases.

BACKGROUND OF THE INVENTION

Wireless ad hoc networks allow node-to-node communication without central control or wired infrastructure. Such networks may have dynamic, randomly-changing, multihop topologies composed of wireless data communication links between the nodes. Ad hoc networks are advantageous because they are inexpensive, fault-tolerant, and flexible. Various known methods relate to data transmission within an ad hoc wireless data communication network. However, most known methods do not address self-configuration of wireless nodes for the formation and maintenance of efficient network topology.

Short range wireless technology such as the Bluetooth™ radio standard promises to remove price barriers to mobile network use. By doing so, wireless devices are becoming available for applications where wired networks have been impracticable and in which prior wireless communication networks have been too expensive or inflexible. While Bluetooth radio technology is an ad hoc networking solution for personal data applications, it provides for only a limited number of communication channels, thereby restricting the number of Bluetooth devices that will communicate over an ad hoc network at any given time. Thus a need exists for an improved low cost networking technology that has the benefits of the Bluetooth price and flexibility, while overcoming the limited networking capacity of typical Bluetooth technology.

Known ad hoc networking methods typically organize the network on the basis of geographic proximity of the nodes or the strength of signals received by the various nodes. While geographical organization or signal strength organization may work well for some applications, many others are limited. Known methods of ad hoc network organization also require nodes to regularly transmit network information to all other nodes in the network, which results in increased radio traffic and interference. Increased radio interference inhibits the formation and maintenance of ad hoc networks having a large number of nodes and requires nodes to transmit at a greater power, which reduces their battery life. Thus a need exists for more efficient methods of forming, organizing, and maintaining ad hoc wireless networks.

Wireless data networks are known for use in warehouse management and other asset tracking applications. However, existing wireless data network technologies are not well suited to asset tracking, which involves a large number of network nodes (e.g., hundreds and thousands). Furthermore, existing wireless technologies are cost prohibitive, are prone to RF interference, and consume a large amount of electrical power. Thus a need exists for a wireless data network technology that accommodates a large number of nodes, creates less RF interference, and consumes less power.

SUMMARY OF THE INVENTION

In accordance with the present invention, a method of forming an ad hoc hierarchical wireless data communication network involves associating a plurality of wireless transceivers with articles to be tracked, and assigning to each of the transceivers a "class designation" representative of a characteristic or behavior of the article with which the transceiver is associated. Each of the wireless transceivers includes a network organization routine that operates in coordination with the network organization routines of other transceivers to establish the hierarchical network based on the transceivers' class designations. The hierarchical network provides an efficient topology for selective communication among wireless transceivers of the same class. The ad hoc network organization routines are preferably implemented in software operable on a digital processor of the wireless transceivers. Alternatively, the ad hoc network organization routines may be implemented in other ways, such as hardwired logic circuitry.

Each wireless transceiver's class designation assignment is included in a profile that is stored in a memory readable by the digital processor of the wireless transceiver. Alternatively, the class designation may be set in hardwired or programmable logic circuitry. Depending on user needs and preferences, the class designation may represent an abstract class of article, such as a ball; a subclass of the class, such as a soccer ball; or a subclass of the subclass (a sub-subclass), such as a size 5 soccer ball, etc. When the class designation represents a subclass, it may also include information about the class or classes abstracted from the subclass, e.g., /ball/soccer_ball/size_5_soccer_ball. Alternatively, the wireless transceiver's class designation may be intentionally limited to subclass (/size_5_soccer_ball), while information about the subclass' abstract class is represented in memory on the transceiver or remotely from the transceiver in class dictionaries or rule sets. In addition to the current class designation, the profile may include auxiliary information such as, for example, a characteristic of the associated article (e.g., serial number, status, process step, physical location, color, size, density, etc.), a behavior of the associated article (e.g., temperature sensitivity, light sensitivity, shelf life, etc.), sensor derived information (e.g., temperature, humidity, altitude, pressure, etc.), a rank of the wireless transceiver in the hierarchical network (e.g., primary ("master"), secondary ("slave"), sub-primary, tertiary, etc.), a priority designation to provide improved response to selected transceivers, a privilege level (e.g., visitor, employee, manager, administrator, super user, etc.), and time-sensitive information (e.g., synchronization timing, real-time sensor data, GPS data, etc.).

The profile and, in particular, the class designation are used by the wireless transceiver to selectively receive packets intended for receipt by transceivers of the same class designation (including/class/subclass). Typically, messages or commands are transmitted to a class (or subclass) of nodes by broadcasting or multicasting the commands in packets that begin with a preamble including the class designation information and possibly other profile information. Transceivers within range of the transmitting transceiver will wake up from a standby mode to receive and process an entire packet only when the packet's preamble matches the receiving transceiver's class designation.

In a preferred embodiment, each of the wireless transceivers includes a low-power radio frequency device ("LPRF"), which operates in accordance with the Bluetooth™ system specification. It should be understood that the invention is not limited to use with Bluetooth™ technology, but can be used with any wireless transceiver having the capability to communicate directly with multiple other wireless transceivers, such as wireless ethernet transceivers, 802.11, Home RF, and others. The term "LPRF" as used herein refers generally to a two-way wireless radio-frequency data communication device that transmits data in packets, and is not limited to a particular signal strength or power consumption.

The self-configuration routines used to form ad hoc class-based networks in accordance with the present invention may also be used to perform autonomous modification and reconfiguration of such networks in response to changes in the location, status, behavior, characteristics or class designation of articles associated with the transceivers. Similarly, the self-configuration methods of the present invention facilitate maintenance of radio communication links in response to changes in the operational characteristics of the wireless transceivers and radio frequency transponders that comprise the network fabric. For example, self-configuration routines are responsive to changes caused by battery drain, radio transmitter failures, radio interference, and digital processor failure, by their inherent methods of organizing the network to have optimal link integrity and node connectivity.

In one aspect of the invention, a class adoption step involves an adopting one of the LPRF units that detects the class designation of one or more nearby radio frequency transponders (also known as radio-frequency identification tags, RFID Tags, or RFTs) or of nearby LPRFs, and incorporates the detected class designation in its own profile. Typically, class adoption is performed only when the adopting LPRF is unable to participate in the ad hoc hierarchical network because of a missing or corrupted class designation. In some circumstances, class adoption may be useful even if the adopting LPRF has sufficient class designation information to support communication. For example, an LPRF attached to a pallet could periodically update its class by detecting the classes of nearby LPRF and RFID Tags (e.g., those attached to items placed on the pallet). Alternatively an LPRF unit can be manually programmed with a class designation by use of a handheld interrogator module ("HIM"). The HIM is a sort of remote control device that allows a human operator to program LPRF units and to query LPRF and RFT units. Preferably, the HIM includes an LPRF unit that is controlled by application software designed to facilitate manual human interaction and communication with nearby LPRF and RFT units.

In another aspect of the invention, a network interface module ("NIM") serves as a communication gateway between the ad hoc hierarchical network and an external network such as a local area network (LAN), wide area network (WAN), or the Internet. The NIM includes at least a NIM RF unit for communication with LPRF nodes of the ad hoc network and an external network interface for connecting the NIM RF unit to the external network. A server computer that is typically connected to the external network includes communication interfaces for directing messages and instructions, via the NIM, to selected classes of LPRFs of the ad hoc network. Conversely, LPRFs of the ad hoc network can direct messages and instructions to the server via the NIM.

In conjunction with the server, class-switching facilitates automated and semi-automated segregation, tracking, monitoring, and delivery of assets. The server issues, via the NIM, class-directed messages and class-directed queries to monitor and track a class of LPRF units. User-defined class granularity facilitates the use of separate sub-classes for various attributes and states of the articles, e.g., production batches, phases of production, and the delivery process. By increasing granularity, i.e., using many subclasses (including sub-subclasses, etc.), control commands and messages from the server can be directed to only those sub-classes of interest, rather than all LPRF units. Furthermore, because messages and control commands are transmitted in packets that include in their preambles the class/subclass destination, the LPRF radios excluded from the class do not wake up from standby mode to receive the packets and do not acknowledge or reply to the packets. This reduces radio interference and power consumption while making asset tracking functions more efficient.

In yet another aspect of the invention, the class-based ad hoc network serves as a dynamic distributed hierarchical database system. In this aspect of the invention, transceivers and RFTs include a query handling routine in communication with a memory of the transceiver or RFT. The query handling routine interprets and responds to class-directed database queries and update transaction requests, for example, from an HIM or a server-based asset tracking application operating on the external network. Database queries may include status queries that gather up-to-date status information about the articles. Profile update transaction requests may include requests to change profile data on specified transceivers of the distributed database system. Increased class granularity also facilitates improved data retrieval efficiency in the distributed database system by reducing the number of transceivers that must be involved in a profile query or update transaction.

Additional aspects and advantages of this invention will be apparent from the following detailed description of preferred embodiments thereof, which proceeds with reference to the accompanying drawings.

BRIEF DESCRIPTION OF THE DRAWINGS

FIGS. 3–11 show a time sequence that depicts LPRF units of arbitrary classes "circle" and "triangle", transmitting a series of messages in the course of self-organizing a hierarchical network using a bottom-up propagation approach;

FIGS. 6A, 8A, 9A, 10A, and 11A depict the topology of the ad hoc network formed at the stages depicted in corresponding FIGS. 6, 8, 9, 10, and 11, respectively.

DETAILED DESCRIPTION OF PREFERRED EMBODIMENTS

In a preferred embodiment, multiple LPRF units are provided for serving asset tracking functions. Each LPRF is associated with or attached to one or more articles to be tracked, such as vehicles, packages, warehoused materials, baggage, and any other items being shipped, manufactured, stored, used, or otherwise existing. Each LPRF includes a packet radio device, preferably operating in accordance with the Bluetooth™ wireless data transmission standard. Skilled persons will understand that radio transmission methods other than Bluetooth may also be utilized. Each LPRF includes a memory that stores a profile, which includes a class designation representative of the associated article or articles. A network organization routine operates on each LPRF unit for forming an ad hoc network with other LPRF units of the same class at various times: upon start up, on command, to maintain the network, or as otherwise needed. The network organization routines of multiple LPRF units cooperate to propagate a single-level or multi-level hierarchical network among the LPRF units.

Class-switched networks are reconfigurable in response to changes in the location, status, behavior, characteristics or class designation associated with the transceivers. For example, articles of a class (e.g., in-production) can be selectively transferred to a new class (e.g., shipping) by merely changing the class designation assigned to the transceivers with which the articles are associated. Class-switching also facilitates the use of asset tracking applications and process flow controls to track and manage the assets based on real-world requirements, such as manufacturing requirements, shipment, warehouse management, zone control, environmental impacts, etc. Class-switching also facilitates automated segregation and delivery of assets.

EXAMPLE SYSTEM

Figure 1:
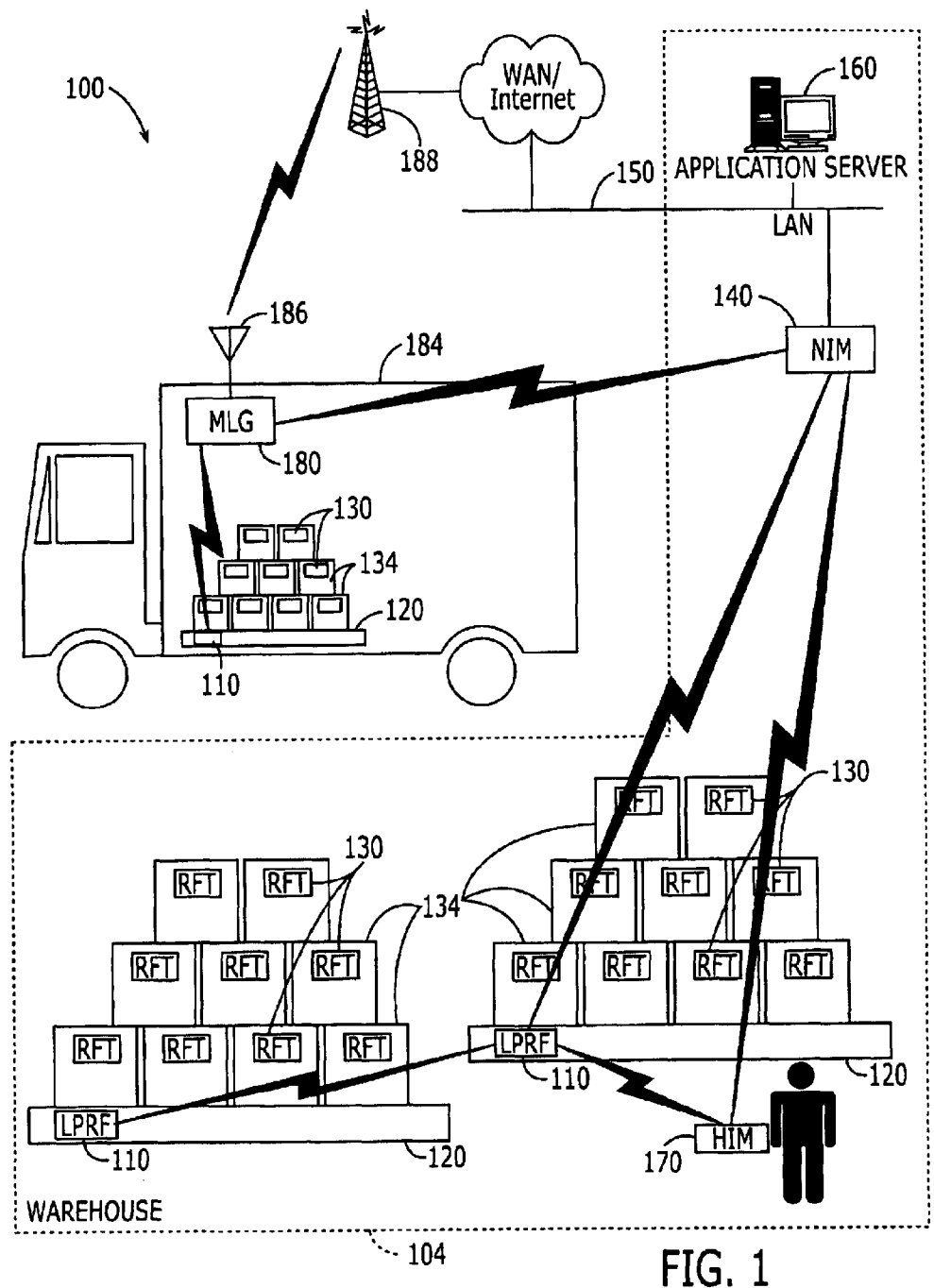
FIG. 1 shows various network components and an example arrangement in the context of a warehouse application in accordance with the present invention.

For example, FIG. 1 shows a deployment of a system in accordance with the present invention in a shipping environment 100 including a warehouse 104. With reference to FIG. 1, an LPRF unit 110 is attached to each pallet 120 in the shipping environment 100. An actual implementation would involve thousands of pallets and LPRFs. For clarity, only three pallets and LPRFs are shown in FIG. 1. Optionally, at least some of the LPRF units 110 are associated with and assume a class designation representative of one or more radio frequency transponders 130 (also known as radio-frequency identification tags, RFID Tags, or RFTs), which are in turn associated with packages 134. The RFTs 130 may be of one of several types. Passive RFTs are devices that collect RF energy inductively and selectively respond, including sending information that is stored on the RFT. They may be viewed as selective reflectors of incident RF signals. Semi-passive and semi-active RFTs are devices that use a battery to power some portion of the circuit to either detect from reader or transmit to the reader. Active RFTs are devices that use a battery to detect and transmit information to or from the reader. RFTs 130 can be read-write or read-only, depending on the requirements of the particular asset tracking application. LPRFs 110 acquire class designation by reading RFTs 130 nearest them, then storing class designation and other profile information in non-volatile read/write memory. Alternatively, LPRFs are preprogrammed (in non-volatile read/write memory) with a class designation representative of packages 134.

A network interface module ("NIM") 140 may be used as a communication gateway between an external network (LAN) 150 and the ad hoc network formed by the LPRF units. The NIM 140 comprises a radio base station directly or indirectly connected to a wired network (e.g., using ethernet, or wireless ethernet). The radio base station portion of NIM 140 is an LPRF-compatible module that communicates with LPRFs of the ad hoc network using the network formation and communications methods of the present invention. In essence, the NIM 140 links the ad hoc network of the present invention with conventional network topologies that use conventional network protocols. The NIM 140 facilitates monitoring, controlling, and querying transceivers (LPRFs 110 and RFTs 130) in the ad hoc hierarchical network using application software running on a server computer 160 connected to the external network 150. The server 160 may be operated on a general purpose computer, such as a personal computer, minicomputer, or mainframe.

A system in accordance with the present invention may include network components in addition to the RFT, LPRF, and NIM components described above. For example, a handheld interrogator module (HIM) 170 and a mobile locating gateway unit (MLG) 180 are provided in this example. HIM 170 is used to manually read class information from network entities, such as LPRFs and RFTs, and to assign class designations. MLG 180, which is installed in shipping vehicle 184, has the core capabilities of an LPRF and NIM, plus at least two additional features. MLG 180 includes a GPS receiver (not depicted) for determining geographic location of shipping vehicle 184 and a cellular or satellite transmitter 186 for transmitting data to server computer 160 via a mobile phone network 188. Because NIM 140, HIM 170, and MLG 180 all include the core hardware and software of LPRFs, they can actively participate in the formation, control, and maintenance of the class-based ad hoc network when used in proximity to the ad hoc network. When a pallet 120 is moved onto shipping vehicle 184, the pallet's LPRF 110 migrates to join an ad hoc network sub-hierarchy headed by MLG 180. MLG 180 is then able to report the migration to server 160 via a network link that it has formed with NIM 140.

For simplicity, the following description of the network formation methods of the present invention refer to an ad hoc network organization routine of multiple LPRF units for forming a class-based ad hoc hierarchical network. However, it is to be understood that NIMs, HIMs, and MLGs include similar network organization routines and utilize the network formation methods of the present invention to participate in the ad hoc network.

Network Formation

In accordance with the present invention, the network organization routines of multiple LPRF units cooperate to propagate a distinct hierarchical network among each of multiple classes of the LPRF units. To accomplish class-based network formation, class designation information is stored in memory on each LPRF unit and thereafter included in the preamble of network formation messages generated by the LPRF units. The class designation information may be represented by any series of codes or characters, the interpretation of which should be standardized and used by all possible message recipients (LPRF, MLG, NIM, HIM, etc.). For example, the class designation may include a class/subclass list (e.g., /Television/Color/24"/Serial__123) or a linked list representing relationships of various classes and subclasses defined in the LPRF's profile. The class designation may also include other information concerning a status, characteristic, or privilege of the LPRF, the network, or other conditions. Virtually any profile information can be included in the preamble and combined with class designation information to be used for network formation. Furthermore, the preamble information can be represented in any convenient format, including various encoding schemes. In one embodiment, a Walsh code is assigned to each class definition and provided to LPRF units of the class. Walsh codes are well understood in the field of digital wireless communications and, therefore, require only a brief explanation here. Walsh codes are used to encode data packets and to designate the class of LPRFs that are enabled to receive and decode a particular packet of data. The association of Walsh codes with class designation information facilitates reduced battery consumption in LPRFs by utilizing message targeting methods requiring very little processing power. The use of Walsh codes also improves data security by encoding of messages. Those skilled in the art will recognize that many other methods may be used for encoding class designation information in the preamble of data packets to facilitate class-based network formation and messaging while reducing battery consumption and RF interference.

Figure 2:
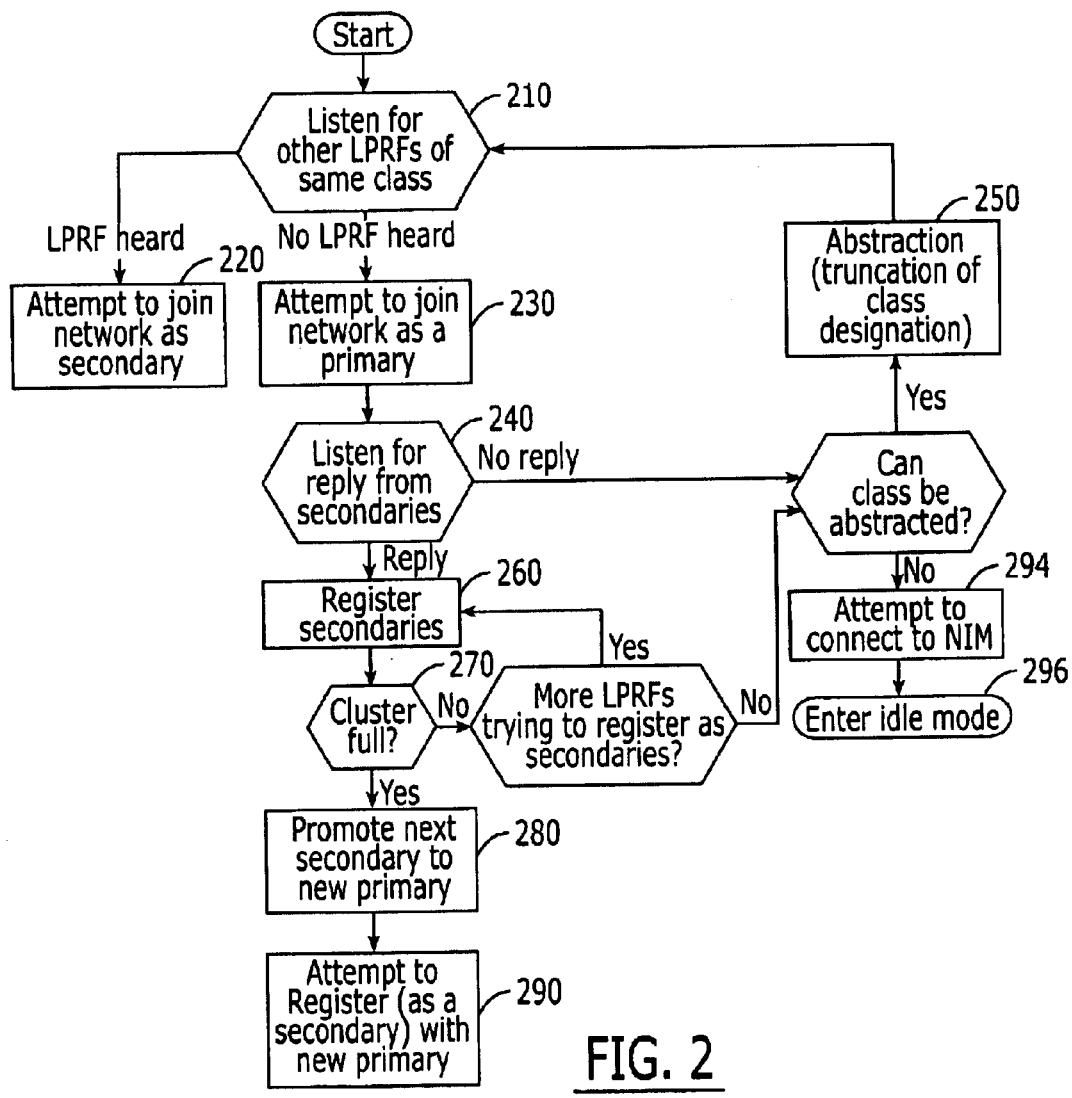
FIG. 2 is a flowchart showing a preferred operation of the network organization routine operating on LPRFs in accordance with the present invention.

FIG. 2 is a process flow diagram depicting a preferred method of operating the network organization routine in accordance with the present invention to propagate a class-based ad hoc wireless network. With reference to FIG. 2, upon power up, a first LPRF of a predetermined class initially listens for transmissions of other LPRFs 210, which would indicate the presence of an ad hoc network. If an ad hoc network is sensed and it includes nodes of the predetermined class, then the first LPRF attempts to join the network as a secondary unit by issuing a registration request signal 220. Otherwise, when no network is sensed, the first LPRF attempts to join the network as a primary unit by broadcasting a primary_ready signal to all other LPRFs of its class 230. The first LPRF then listens for replies from other LPRFs wanting to register as secondaries 240.

If no secondaries reply, then the class designation of the first LPRF is abstracted 250 so that it is more generic. For example, if the initial class designation is "/ball/soccer_ball/size_5_soccer_ball" then the abstracted class is "/ball/soccer_ball". If the class designation cannot be abstracted because it would otherwise be generic to all classes, i.e., class=root ("/"), then the first LPRF attempts to contact the NIM 294 and register under the first LPRF's most generic class (i.e., its root class, for example "/ball") before entering sleep mode to conserve battery power 296.

If secondaries reply, then the first LPRF registers the secondaries 260 until the first LPRF's "cluster" is full 270. A "cluster" comprises a primary LPRF and the secondary LPRFs with which the primary communicates directly, and may be limited in size by the number of communication channels that can be supported by the primary operating as cluster head. Once a cluster is full, the first LPRF (cluster head) responds to the next LPRF attempting to register as secondary by promoting it to the status of primary to the first LPRF 280. The first LPRF then attempts to register with the new primary as one of its secondaries 290. The new primary would in turn be available to serve as cluster head for other LPRFS, to promote other LPRFs to higher level primaries, and so forth, thereby propagating the ad hoc network from the bottom up. The first LPRF and all other LPRFs form the ad hoc network by using the same network organization routine.

On the other hand, if the first LPRF's cluster does not fill and there are no more LPRFs attempting to register with it as secondaries, and the LPRF has a class other than its root class, then the first LPRF truncates its class designation 250 and starts the entire network organization routine from the top (i.e., listening for the presence of LPRFs of the truncated class 210, etc.). If no other LPRFs are attempting to register and the first LPRF's class cannot be abstracted, the first LPRF attempts to register with the NIM (step 294) then goes into idle mode (step 296). Alternatively, the first LPRF may start attempting to register with the NIM soon after it becomes a primary 230, concurrently with filling its cluster. When promoting an LPRF to primary, the first LPRF would also pass to the LPRF responsibility for communication with the NIM, if possible.

Under Bluetooth, the NIM communicates over a maximum of only 10 channels. However, on each channel, the class designation can revolve to address multiple classes of LPRFs. Upon registration with the NIM, the system may establish a revolving communication schedule with revolving class addressing that allows the NIM to communicate with hundreds or thousands of classes of LPRFs. Synchronization between the NIM and LPRFs is important for proper operation of revolving class addressing and to minimize battery consumption. Accordingly, as classes of LPRFs are added to the network and establish communication with a NIM, the NIM may synchronize, reconfigure, and optimize the class' schedule for revolving class addressing.

In a top-down network organization strategy (FIGS. 12–21), when a cluster is filled, the secondaries that have already registered with the first primary may be promoted by the first primary to assume the role of middle-hierarchy primaries called "sub-primaries". Sub-primaries, which continue as secondaries below the first primary, provide connectivity between the first primary and any additional LPRFs that are attempting to join the network in the cluster headed by the sub-primaries.

In both the top-down and bottom-up methods, promoted secondaries (primary primaries and sub-primaries) become cluster heads that may provide connectivity to LPRF units of the same class that are beyond the transmission range of the first primary. The LPRF units thereby form a hierarchical multi-tiered network based on class that propagates both in quantity of nodes and geographic coverage. Tightly grouped class-based networks in accordance with the present invention make it possible to communicate to and among a particular target class of LPRF units without requiring messages to be received, processed, or routed by LPRFs that are not of the target class or an abstracted class. This hierarchical class-based network organization is, thus, an efficient topology for communicating among LPRF units of the same class because it reduces the number of network links through which messages must pass, reducing RF interference and battery power consumption.

FIGS. 3–11 depict LPRF units in a time-sequence of events showing a bottom up method of class-based network formation in accordance with a first preferred embodiment of the present invention. With reference to FIGS. 3–11, LPRF units 1–6 and A–G include transceivers of respective classes "circle" and "triangle", which are arbitrary class designations assigned for purposes of illustration only. In this example, the LPRF units 1–6 and A–G operate on up to three communication channels and one general channel (also called the control channel). The LPRF units all include network organization routines operating in accordance with the method shown in FIG. 2.

The network organization routines of LPRF units 1–6 and A–G are configured to initially listen for the preambles of packets to identify only those packets transmitted by other LPRF units of the same class (FIG. 2, step 210). In this example, the preamble of each packet is represented by a colon-separated string of information, as follows:

: Target Class: My Profile: Action Requested: Target Cluster Head ID where Target Class is the class of LPRFs directed to wake up from standby to receive and process the packet. In this example embodiment, the Target Class is either/circle or /triangle (no subclasses). However, in a more complex embodiment (not shown) the Target Class designation could include subclass information in a slash-separated list, e.g., /ball/soccer_ball/size_5_soccer_ball, in a linked list, with Walsh codes, or by any other method of representing class and subclass information. In addition to the class designator, the Target Class portion of the preamble may include a unit ID unique to a single recipient, e.g.,/circle/unit1.

Figure 3:
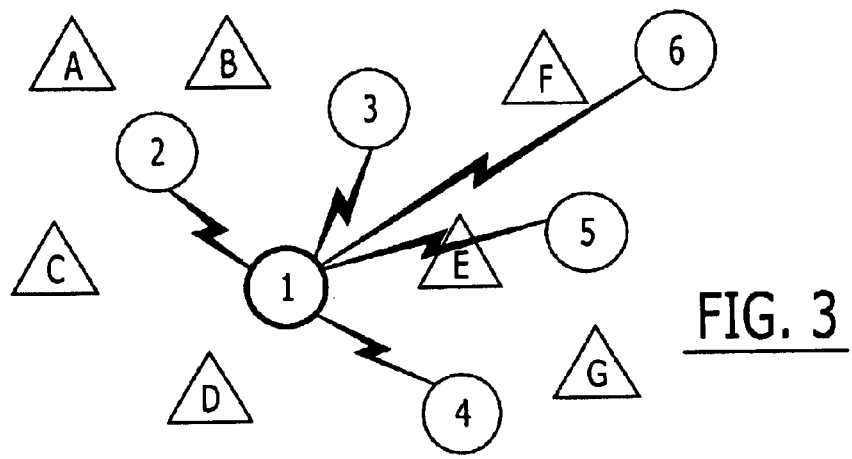

With reference to FIG. 3, after listening for packets of its class (circle) and hearing none, LPRF unit 1 attempts to start a network as a primary, by broadcasting a packet having the following preamble:

: /circle: /circle/unit1: primary_ready: no_primary

The class designation "/circle" causes only LPRF units of the circle class to receive and process the packet. LPRF unit 1, if it receives no replies, may retransmit the primary_ready message multiple times before timing out and beginning a beacon procedure or entering a battery-saving lost mode. The packets (and others described below) may encapsulate a data payload or may have a null payload.

LPRFs are preferably synchronized to allow scheduled communication to a particular class of LPRFs at regular intervals. When an LPRF communicates to a target class in the ad hoc network, the LPRF transmits a packet at a time precisely synchronized with the receiving class. To conserve battery power, the receiving class of LPRFs only powers up to listen at each interval and only for very small periods of time (e.g. a few milliseconds) when packet preambles would normally be transmitted. The intervals at which an LPRF listens for messages directed to its class is called the duty cycle, which can be dynamically adjusted to respond to network communication demands while minimizing battery consumption. Depending upon the time sensitive nature of the articles being tracked and their priority, a period of inactivity may prompt an LPRF to limit its duty cycle to intervals of minutes or hours. After a prolonged period of inactivity, an LPRF may ping (transmit) to determine whether other LPRFs are still alive and available for communication. Assuming that no network changes have occurred, the LPRF goes back to sleep until the next duty cycle. Network changes may cause all or a part of the ad hoc work to reconfigure.

Figure 4:
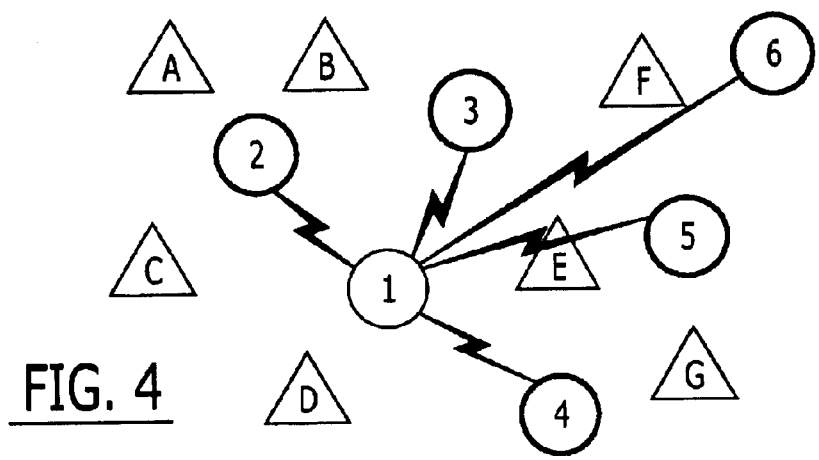

With reference to FIG. 4, in response to the "primary_ready" signal, LPRF units of class "/circle" that are within range of unit 1 respond with a registration request, as listed in Table 1:

TABLE 1

| Sending LPRF Unit No. | Preamble |
|---|---|
| 2 | :/circle/unit1 :/circle/unit2 : registration_request :/circle/unit1 |
| 3 | :/circle/unit1 :/circle/unit3 : registration_request :/circle/unit1 |
| 4 | :/circle/unit1 :/circle/unit4 : registration_request :/circle/unit1 |
| 5 | :/circle/unit1 :/circle/unit5 : registration_request :/circle/unit1 |
| 6 | :/circle/unit1 :/circle/unit6 : registration_request :/circle/unit1 |

Because the registration request packets include in their preambles a target class of LPRF unit 1, only LPRF unit 1 will wake up from standby to receive and process the registration request packets. The transmitters of units 2–6 would typically include collision avoidance routines to avoid interfering transmissions of the registration request packets.

Figure 5:
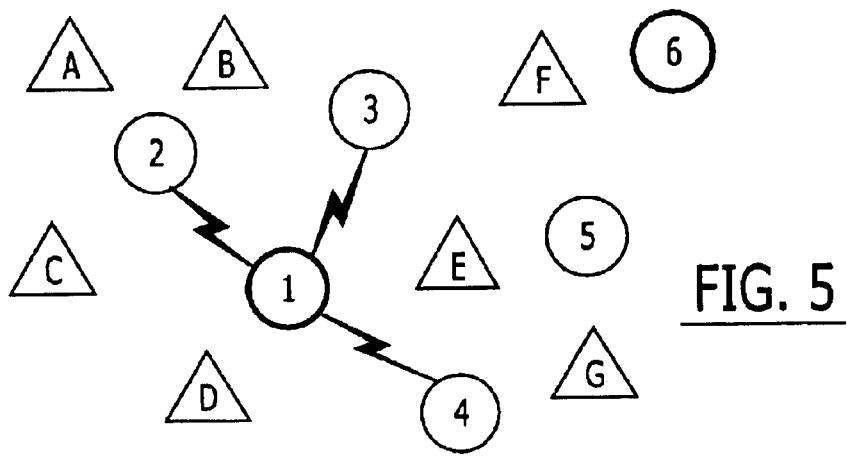

With reference to FIG. 5, in response to receipt at LPRF unit 1 of the registration_request signals from LPRF units 2–6, network organization routine of LPRF unit 1 registers and acknowledges secondary LPRF units to form a cluster. In this example, LPRF unit 1 has a maximum cluster capacity of three secondary units. Consequently, it only registers and acknowledges the three LPRF units from which the strongest registration request signals are received (in this example, units 2–4). By registering and acknowledging secondaries on the basis of signal strength, rather than first-come-first-served or some other method, the network organization routine establishes a cluster that is energy efficient for communication within the cluster. To acknowledge registration of the secondaries, LPRF transmits an acknowledgement signal to the secondaries, as set forth in Table 2:

TABLE 2

| Target LPRF Unit No. | Preamble |
|---|---|
| 2 | :/circle/unit2 :/circle/unit1 : registration_ackn :/circle/unit1 |
| 3 | :/circle/unit3 :/circle/unit1 : registration_ackn :/circle/unit1 |
| 4 | :/circle/unit4 :/circle/unit1 : registration_ackn :/circle/unit1 |

The network topology is now shown in FIGS. 6 and the cluster hierarchy is depicted in FIG. 6A. The two concentric circles of LPRF unit 1 indicate that it is a cluster head at level 2 in the network hierarchy.

With reference to FIG. 7, with its cluster capacity now exceeded, LPRF unit 1 (the cluster head) selects from the un-networked LPRFs the one having the strongest registration request signal (in this example LPRF unit 5) and directs the selected un-networked LPRF to become a new primary. The new primary will serve as a new cluster head for a cluster in which LPRF unit 1 will become a secondary. In this example, the command from LPRF unit 1 to LPRF unit 5 would be:

: /circle/unit5 :/circle/unit1: promote_and_request_primary: no_primary

With reference to FIG. 8, LPRF unit 5 acknowledges the promotion signal from LPRF unit 1 and begins to propagate the network at the next higher level in the hierarchy. The hierarchy now has three tiers, as depicted in FIG. 8A. In acknowledging its promotion and registration as master of LPRF unit 1, LPRF unit 5 transmits its acknowledgement packet to all units of its class within range, by the following preamble:

: /circle: /circle/unit5 : primary_acknowledged: /circle/unit5

By transmitting to all units of its class within range, LPRF unit 5 efficiently registers with LPRF unit 1 and concurrently shares primary status information with all LPRF units of its class. The three concentric circles around LPRF unit 5 indicate that it is a primary in the third-level of the hierarchy.

With reference to FIGS. 9 and 9A, LPRF unit 6, upon receiving unit 5's registration acknowledgement (FIG. 8), requests to register as a secondary below unit 5 by sending a packet with the following preamble:

: /circle/unit5: /circle/unit6: request_primary: /circle/unit5

To which, unit 5 responds with:

: /circle/unit6: /circle/unit5: registration_ackn: /circle/unit5

This exchange establishes the hierarchy shown in FIG. 9A.

With reference to FIG. 10, a subnet of triangle class LPRF units A–G is similarly formed (concurrently with the steps shown in FIGS. 3–9, so that there are two distinct hierarchies, as shown in FIG. 10A.

Figure 11:
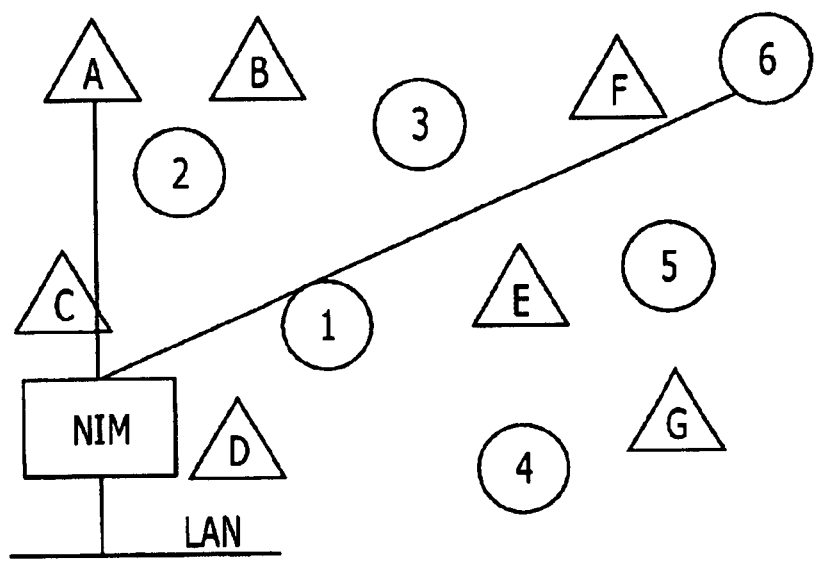
Figure 11A:
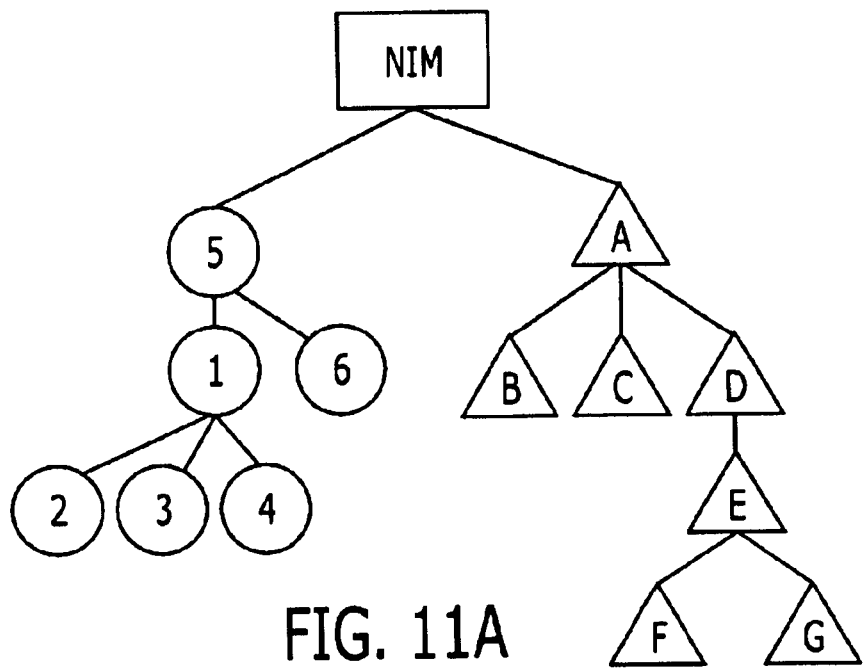

With reference to FIG. 11, if a NIM is available, the root primaries (LPRF units 5 and A, also called "primary primaries"), register with the NIM to establish connectivity to an external network, and computers communicating thereon.

FIGS. 12–21 illustrate a top-down class based network formation sequence in accordance with a second preferred embodiment. With reference to FIGS. 12–21, the LPRF units transmit a series of messages in the course of self-organizing a hierarchical network, the topology of which is shown at various stages adjacent to FIGS. 13, 16, 19, and 21 in respective FIGS. 13A, 16A, 19A, and 21A. As with FIGS. 3–11, the transmitting transceivers are shown in heavy bold outline.

Figure 12:
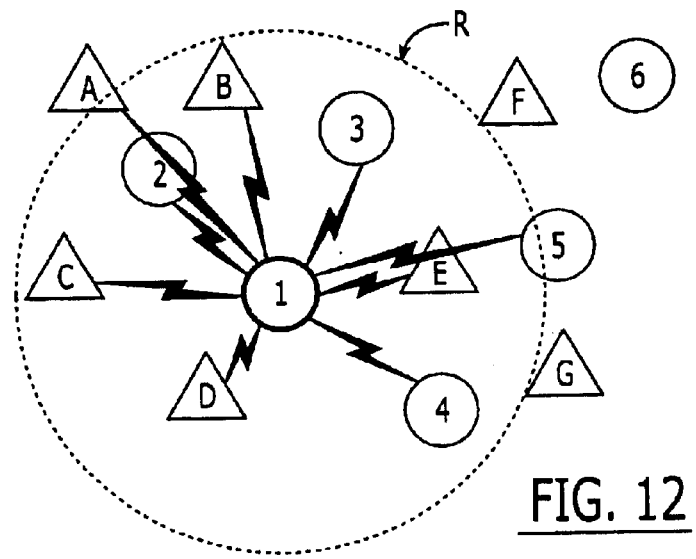
FIGS. 12–21 depict a time sequence of ad hoc network formation using a top-down propagation approach.

With reference to FIG. 12, a first LPRF unit 1 wakes up and reads profile information stored in its memory, including a predefined class designation ("circle"). LPRF unit 1 then listens for transmission activity by other LPRF units of the same class. If nearby LPRF units of class circle have already formed a network, LPRF unit 1 will attempt to join the network. Otherwise, LPRF unit 1 attempts to organize an ad hoc network.

To begin organizing the ad hoc network, LPRF unit 1 transmits a primary_ready signal including its class designation. As in the first preferred embodiment, the primary_ready signal is preferably a data packet that includes in its preamble digital data representative of the "circle" class designation. In FIG. 12, the bold boundary of LPRF unit 1 indicates that it is transmitting rather than receiving. The range of the transmission is depicted by dashed circle "R". Nearby LPRF units 2–5 and B, C, D, and E, which are within range of the primary_ready signal, each processes only the preamble portion of the primary_ready signal to determine whether the available primary LPRF unit 1 is of the same class. By first processing only the preamble portion of the primary_ready signal, battery power is conserved in triangle LPRF units B, C, D, and E. If it is of the same class (i.e. it has a matching class designation), the receiving LPRF unit (in this example, each of LPRF units 2–5) wakes up, receives, and processes the entire primary_ready signal, then responds as shown in FIG. 13, described below.

Figure 13:
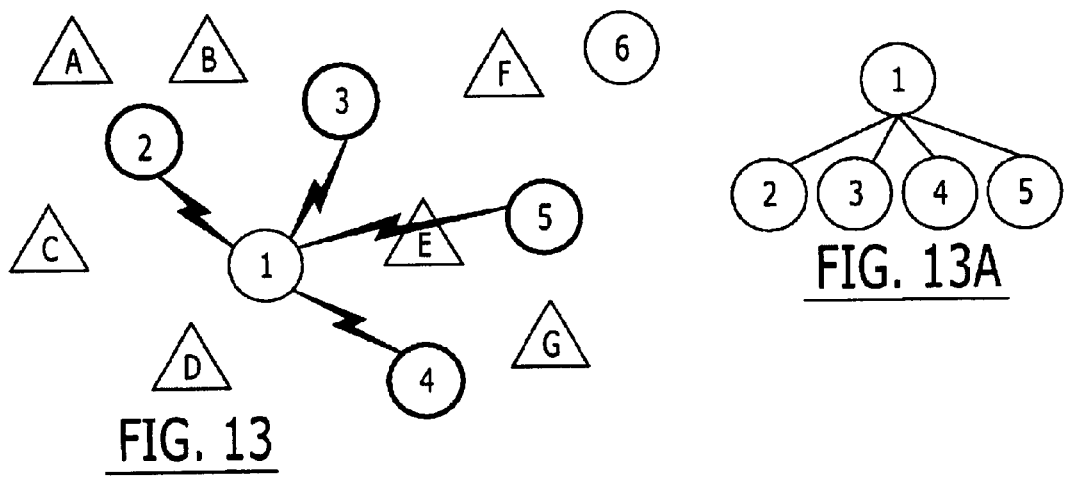
Figure 13A:
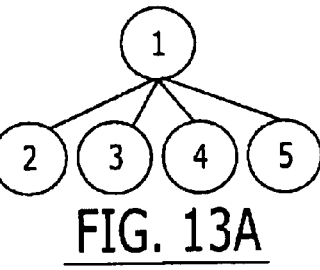

With reference to FIG. 13, each of the LPRF units of the circle class that received the primary_ready signal in FIG. 1 (i.e., units 2–5) responds to the primary_ready signal with a registration_request signal. Upon receipt of the registration_request signal, LPRF unit 1 assumes the status of a "primary" network node, while LPRF units 2–5 assume the status of secondaries. FIG. 13A shows the resulting 2-tiered network hierarchy tree representative of the network formed between LPRF units 1–5.

Figure 14:
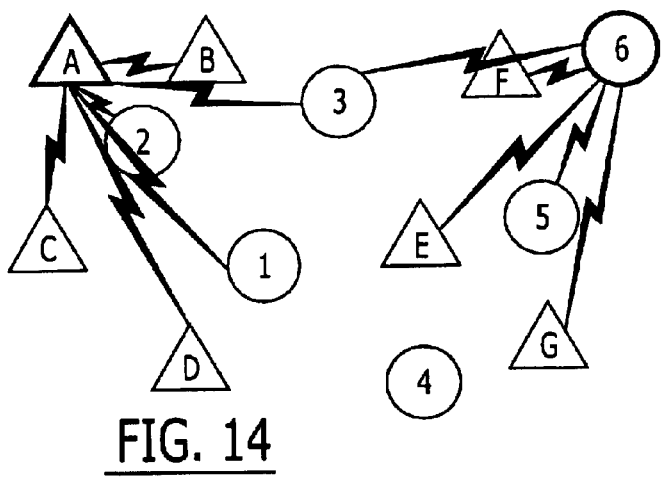

Next, with reference to FIG. 14, a third tier of the hierarchical network is formed by circle LPRF unit 6. LPRF unit 6 was out of range of LPRF unit 1's primary_ready signal (FIG. 12), but within range of the registration_request of LPRF units 3 and 5 (FIG. 13). LPRF unit 6, which was listening during the step shown in FIG. 13, received the registration_request signals of LPRF units 3 and 5 because those signals included the "circle" class designation matching the "circle" class designation of LPRF 6. The registration request signals indicate to LPRF unit 6 the presence of a nearby network of "circle" class LPRF units, which causes LPRF unit 6 to transmit a request to join the network.

Concurrently with the ongoing formation of the "circle" class network, FIG. 14 also depicts the beginning stages of the formation of a network of "triangle" class LPRF units A–G. Triangle LPRF unit A wakes up and listens for the presence of a "triangle" class network. Hearing no other triangle class LPRF signals, LPRF unit A transmits a primary_ready signal, similar to the transmission of LPRF unit 1 shown in FIG. 1, but with a "triangle" class designation forming part of the preamble of the primary_ready signal.

Figure 15:
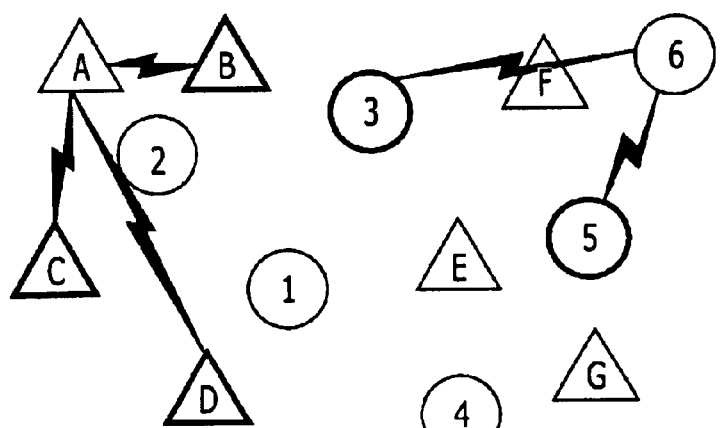

With reference to FIG. 15, triangle class LPRF units B, C, and D receive the primary_ready signal of LPRF unit A and respond with registration_request signals, thereby forming a second ad hoc network hierarchy, as shown in FIG. 15A.

Figure 16:
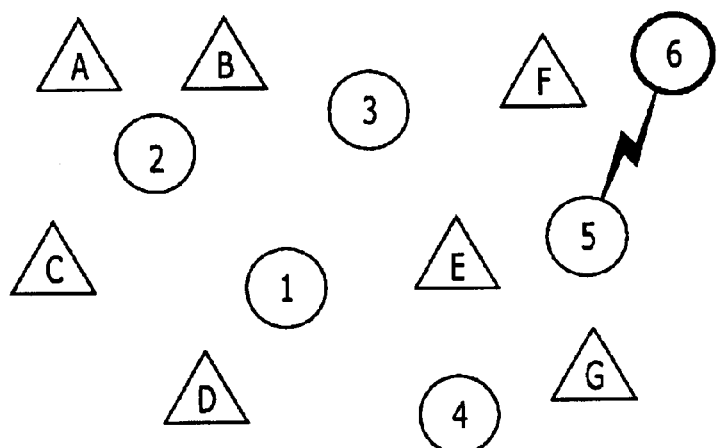
Figure 16A:
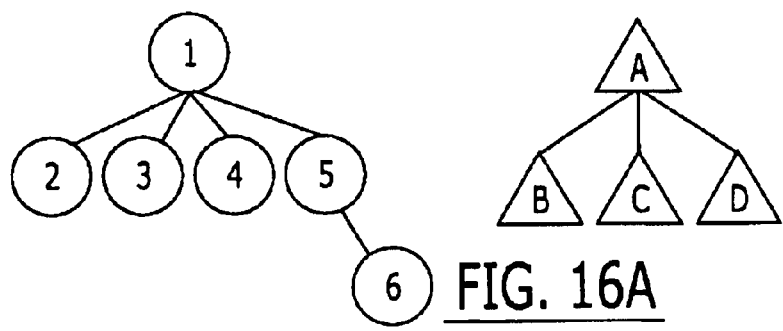

Also shown in FIG. 15, circle LPRF units 3 and 5 respond to the request to join of LPRF 6 (FIG. 14) with primary_ready signals. LPRF 6 then responds to the strongest primary_ready signal received (in this example, the signal from LPRF unit 5), with a registration_request. LPRF unit 6 thereby forms a third tier of the circle network hierarchy, as shown in FIG. 16A.

Figure 17:
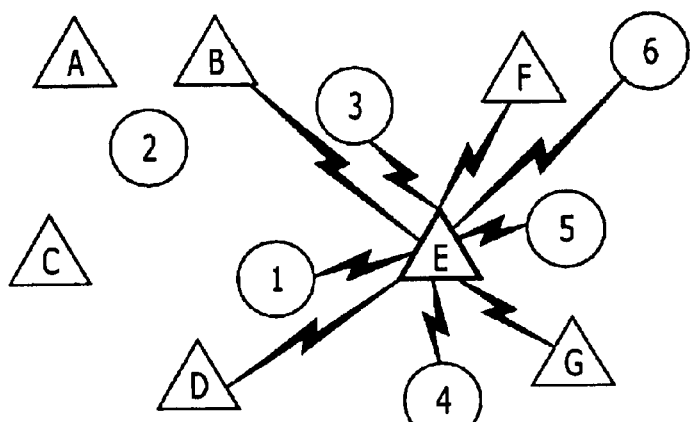
Figure 18:
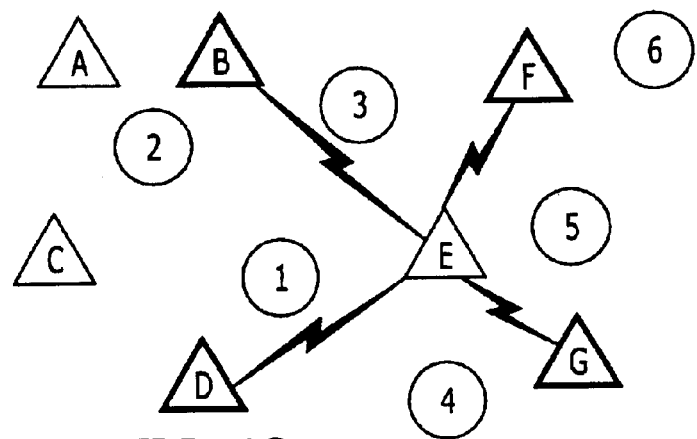
Figure 19:
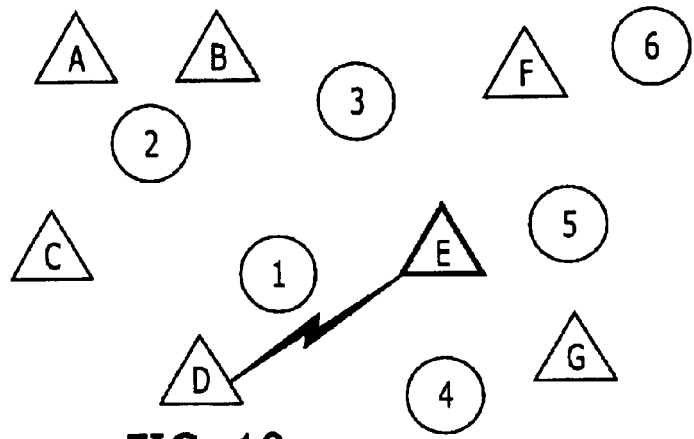
Figure 19A:
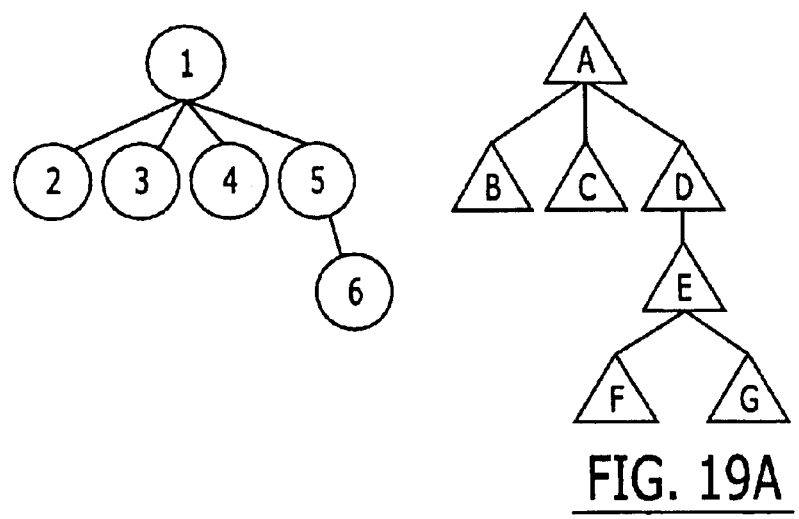

With reference to FIGS. 17–19, triangle class LPRF unit E joins the network of triangle class LPRFs already formed by LPRF units A, B, C, and D.

Figure 20:
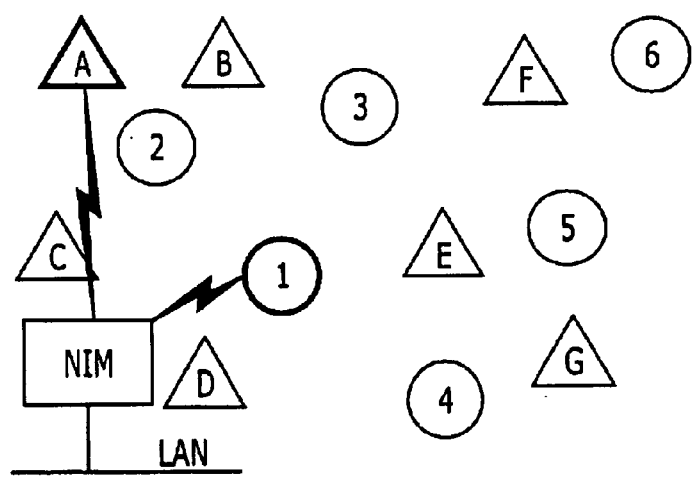
Figure 21:
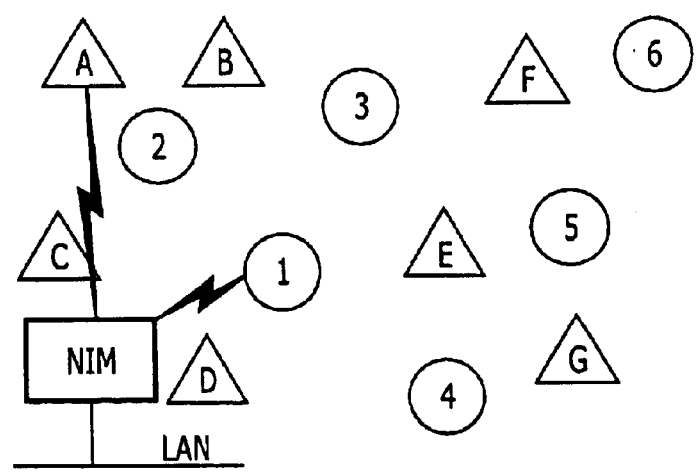
Figure 21A:
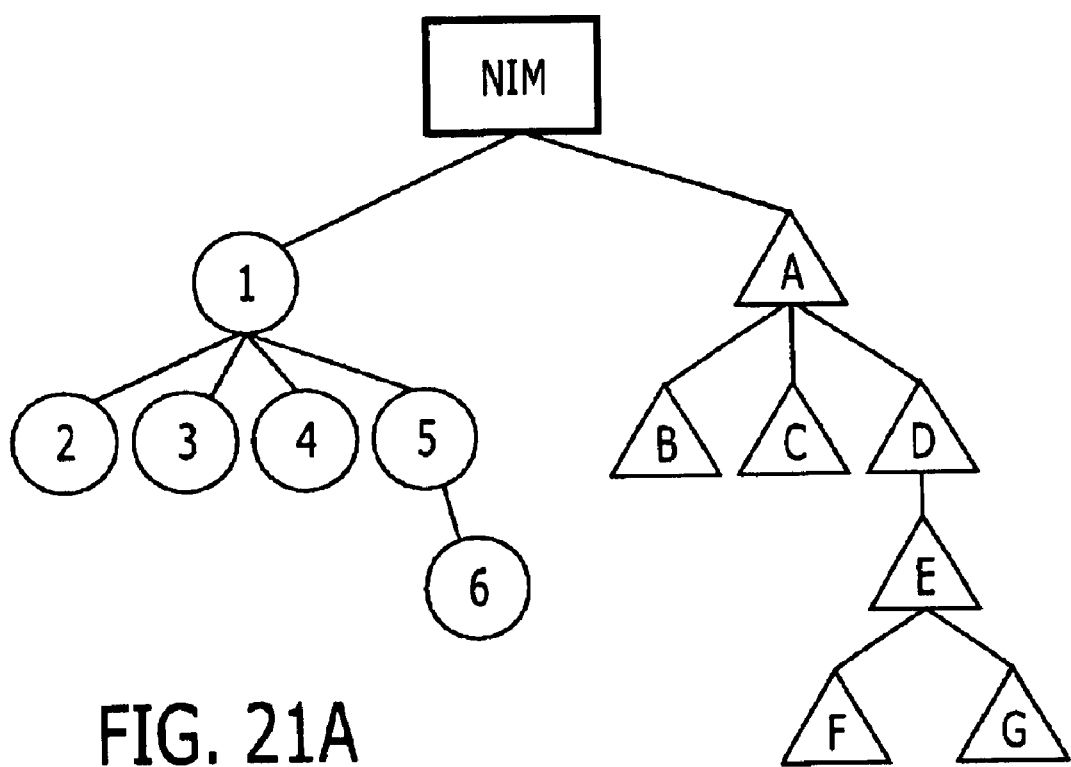

FIGS. 20 and 21 illustrate use of the method of the present invention to establish communication with devices outside of the ad hoc hierarchical network shown in FIGS. 1–8. External connectivity is established by creating a connection between an NIM and the root primaries of each of the circle and triangle classes.

In keeping with the present invention, those skilled in the art will recognize that methods of network formation other than top-down and bottom-up may be used to propagate a class-based multi-level hierarchical network amongst LPRF units. For example, a middle-outward approach or star configuration may be used to propagate the hierarchical network.

Once established, the class-based ad hoc hierarchical network provides functionality as a dynamic distributed hierarchical database system. In this aspect of the invention, transceivers and RFID Tags may include a handling routine in communication with a memory of the transceiver or RFID Tag. The handling routine interprets and responds to class-directed database commands, e.g. data queries or data updates from an asset-tracking application. Database queries may include status queries that provide the asset tracking application with real-time up-to-date status information about the articles. Similar to network organization messages, class-directed database commands include preambles that identify a class (and subclass) of LPRF units to which they are directed. In this manner, only those LPRF units of the selected class need process the database command. Class-directed database commands may also include, in their preambles, a wildcard that indicates to query handling routines that all subclasses of the class should receive and process the database commands. Class-based addressing avoids radio interference and reduces power consumption by LPRF units that are clearly outside the scope of the search criteria. Database performance can also be enhanced by selecting LPRF classes and subclasses in a way that mirrors a preferred hierarchical structure for the data they will carry. In this way, the network structure acts as a hierarchical database that facilitates fast and efficient data queries.

The following are examples of further useful applications for class-switched networks:

EXAMPLE 2

Luggage Tagging System

When a passenger checks in at the airport an RFT is attached to each item of the passenger's luggage. A corresponding passenger-RFT is given to the passenger to verify his/her identity at the destination baggage pickup. An LPRF near the check-in counter logs the luggage into the tracking system along with the customer identification number and flight information. Profile/preamble information might include, for example:

: Tag_Type: Airline_Name: Passenger_Class: Origin_and_Destination: Flight_No: Tag_Status: passenger_id An example passenger-RFT profile might include:

: passenger: Delta_Airlines: First Class: ATL-SEA: FLT-490 : check-in: 45567788KDKO8 while an example baggage RFT might include:

:baggage: Delta_Airlines: First Class: ATL-SEA: FLT-490: check-in 45567788KDKO8

Upon check-in, the luggage enters the conveyer belt where it is read by another LPRF that changes its Tag_Status from "check-in" to "luggage-transfer_station_4334". Multiple LPRFs can be placed along the conveyer belt system to identify location and give granularity to the position of the luggage. Trucks that deliver the luggage to the plane also have LPRFs attached to the truck and convey a new state of "departure_on-transfer-truck-1441 ". Once the luggage is put on the plane, yet another LPRF logs the luggage into the system and cross checks the luggage against the luggage that is supposed to be on the flight. Any luggage that is not supposed to be on the flight is flagged for removal and rerouted to its true destination. Any luggage that is not accounted for raises an alarm so that attendants are alerted to its arrival time, its position or its last known position.

Once the airplane arrives at its destination the luggage is checked in by an LPRF and its state is changed to destination information (i.e. "arrival_on-transfer-truck-6633"). At the destination baggage pickup, the RFTs on the luggage are read by an LPRF station located near an exit of the baggage area. The LPRF checks the luggage RFTs against the passenger's personal passenger-RFT to insure that the passenger is authorized to pick up the luggage and to alert the passenger if he or she has inadvertently picked up the wrong luggage.

EXAMPLE 3

Warehouse/Retail

A warehouse store (e.g., Costco) carries hundreds of brands and wants to keep a real-time inventory of goods in the warehouse. An LPRF is attached to each pallet of goods and assigned a class designation that denotes the manufacturer of goods on that pallet (e.g., Pillsbury, Sony, Kellogg's, etc.). Each LPRF may also include in its class designation or profile, information about the goods on the pallet. Boxes on the pallet each carry an RFT that is read by the LPRF. Each LPRF gathers information about the RFTs that its pallet is carrying and relays the information back to the network server on demand. At any given time, an employee of the warehouse store can inventory goods of a selected manufacturer class by sending a query that will be received only by LPRFs of the selected class of manufacturer. Messages or queries directed to a selected class will not affect the battery life of LPRFs of other classes because only LPRFs of the selected class will wake up from standby mode to receive the messages and queries. The manufacturer classes can be divided into subclasses to further reduce battery consumption and radio interference.

EXAMPLE 4

Shipping Containers for Rail or Ship

Containers full of material can be received and logged in to a yard by manufacture based on class information stored on the LPRFs. The LPRFs form a network with other containers from a particular manufacturer and allow quick and efficient tracking of containers. Messages or queries directed to a selected class will not affect the battery life of LPRFs of other classes because only LPRFs of the selected class will wake up from standby to receive the messages and queries. The manufacturer classes can be divided into subclasses to further reduce battery consumption and radio interference.

EXAMPLE 5

Manufacturing and Supply Chain Operations

A company manufactures computers and wants to track the status of the supply chain. The classes defined are raw material, component stuffing, monitor assembly, final assembly, shipping, in transit, and distributor. The manufacture can inventory raw material throughout the process by addressing the raw material class, find out where in the manufacturing process the computer has reached by addressing monitor assembly or final assembly classes.

Server Assisted Network Formation

We described above, with reference to FIGS. 3–11 and 12–21, respective first and second preferred embodiment network formation methods that comprised a peer-centric network formation, in which transceivers self formed an ad hoc network then contacted a server via an NIM. In this peer-centric method, an LPRF contains software that is pre-programmed to interpret class information contained in the preamble of messages being transmitted by other LPRFs and then negotiate for primary status. The LPRFs use commands such as inventory RFTs, determine primary, and others (described below) to make decisions on class and other profile information that has been pre-programmed in the LPRFs. Once the LPRFs have formed the network, information is transmitted by the LPRFs for connectivity to server applications.

Other network propagation methods include a server initiated method and a client/server shared method. In the server initiated method, the LPRFs have been attached to pallets or areas to read RFT information. The LPRFs are turned on and form an arbitrary network using commands such as Determine Primary. This arbitrary formation is done so that the server can address particular LPRFs, but is not based on class designations. The RFTs are read by the LPRFs and profiles are downloaded to the RFTs from the LPRFs based on commands such as "Inventory RF Tags", described below. Profiles defining a new class structure are then downloaded from the server to the LPRFs (and any read/write RFTs) based on business rules. The networks are then instructed to Determine Primary again so that the network is re-formed according to the newly-assigned class structure.

In the client/server shared method, the LPRFs contain software that has been pre-programmed to interpret profile information. The profile information could be RFT IDs, states, etc. The LPRFs are reset and boot up looking to read the saved profile, to form hierarchical networks based on a class designation of the profile, and to look for primary/secondary configurations. Once the LPRFs have setup the initial network, network server business rules are downloaded to the LPRFs in the form of new profiles to "fine tune" the network.

Functions/Commands

The following is a list of functions that can be activated in an LPRF (and in some cases in an RFT) to accomplish class based network formation, re-formation, and other class switching properties. The name of the function is followed by the description of the function in the context of the type of transceiver in which it is to be implemented (LPRF and/or RFT).

Acquire Class or Sub-Class Structures—Software is located on the LPRFs and RFTs that interpret Class and Sub-Class structures. To initialize, the LPRFs arbitrarily form networks based on the ability to talk to other LPRFs. When a radio wakes up it broadcasts a message to other LPRFs that it is a primary and is looking for secondaries. Other LPRFs that are waking up receive the message and try to become part of the primary's network. If they are unable to communicate to the primary or if the primary's network is full the secondary LPRF will attempt to become a primary and continue the process. Once the LPRFs have established their network, the primary radios contact the network server and are downloaded a profile. The profile downloaded is based on options such as reading RFTs, LPRF IDs, business rules located at the server and other information that has been downloaded by an HIM. Once the LPRFs, have their respective profiles, the LPRFs reform the networks based on class and sub-class rules defined by the software located on the LPRFs.

If read-only RFTs are used then the class structure can be pre-programmed but will not be able to be modified dynamically. Dynamic acquisition of class is based on rules defined by the network server application.

Allow Class/Sub-Class/State Change—Class changes are allowed based on business rules setup by the customer to track and group their assets. The rules are built into the server application and the software on the LPRFs. The profile provides information that allows dynamic decisions to be made by the LPRFs. Once the LPRFs have determined that their class, sub-class or state has been changed, the LPRFs must join the new class of LPRFs. The ability to allow a class change provides functionality to allow dynamic changes to LPRF class. For example, with reference to FIGS. 10 and 10A, changing the class of triangle LPRF unit E to the circle class would cause LPRF unit E it to join the circle hierarchical subnet, either as a secondary in a cluster of an existing circle primary (e.g., circle LPRF unit 5), or by becoming a primary itself. Continued contact between LPRF unit E and the triangle class would be limited based on system rules but typically be terminated.

To move the concept from the abstract to a concrete example, class triangle could represent goods in the process of being manufactured in a factory. When these goods enter a shipping section of the factory, they would automatically acquire a "shipping" class representative of their current location and associated status.

Form Class—A new class can be established by downloading a new profile and using the command "Determine Primary". The command uses techniques in FIGS. 2–21 to establish the class based network. Profiles and software on the LPRFs form the basis for decisions on network formation. The profile must be pre-programmed in the LPRFs or RFTs or downloaded from the server application.

Combine Classes—The combination of classes is required when the user no longer wishes to differentiate between two originally defined classes. The profile is downloaded either as a new class profile that has a new class name or downloads to the class to be replaced by the other existing class. After combining classes, the LPRFs may reform the network using the LPRF network organization methods of the present invention.

Determine Primary—When a LPRF "wakes up", it determines whether it is capable to become a primary. If the health of the device is sufficient, it sends out a message to other LPRFs of its class that it wants to be a primary.

Ping MLG/NIM/HIM—The LPRFs will send out a special message identifying itself as part of an MLG, NIM or HIM. The purpose of this message is to inform the LPRFs (in stand-alone mode) that they have additional capabilities. The identifying message allows the HIM to query information from the LPRFs or RFTs while the message from the NIM and MLG indicate ability to communicate to the server application.

Inventory RF Tags—The LPRF will read all RFTs within range. The profile downloaded from the server will help the LPRF control mis-reads and extra tags. Multiple reads of the tags insures high reliability.

Report Communication Links—Upon formation of an ad hoc network, an LPRF stores identifiers that describe the LPRFs network neighbors in adjacent levels of the network hierarchy. The primary will have all the IDs for its secondaries, while the secondaries store data on the primary and any sub-secondary LPRFs. The knowledge of communication links, both upstream and downstream will support responsiveness to queries from the network server.

Report Local Classes—By listening for preambles of messages in other classes, LPRF radios will store class information about other radios in the vicinity. The LPRFs will support queries from the network server to supply the local class information back to the network server, regardless of whether the reported class is maintains connectivity to the server.

Class Structure Secondary only—The secondary only designation provides entry into a system without giving network formation rights. The LPRF with this designation in the profile is allowed to act like the other secondary LPRFs but is unable to take on the role of a primary in the system. This allows the LPRF the ability to move from class to class without disturbing the network formation. A practical use could allow a customer who walks into a distributor (e.g., Costco) to read item names, cost or location of items in the store, without interrupting or usurping the distributor's asset tracking network.

It will be obvious to those having skill in the art that many changes may be made to the details of the above-described embodiments and examples of this invention without departing from the underlying principles thereof. The scope of the present invention should, therefore, be determined only by the following claims.

What is claimed is:

1. A method of forming a wireless data communication network amongst a plurality of transceivers for tracking articles associated with the transceivers, comprising:
    assigning a class designation to a population of transceivers based on a common characteristic or behavior of the articles associated with the transceivers;
    selecting a primary transceiver from among the population of transceivers, the remainder of the population of transceivers being secondary transceivers; and
    forming a class-based hierarchical network amongst the population of transceivers, including:
        (a) broadcasting from the primary transceiver a primary availability signal including a primary class identifier representative of the class designation assigned to both the primary transceiver and the secondary transceivers,
        (b) in response to the primary availability signal, transmitting from a responding one of the secondary transceivers a registration signal including a secondary transceiver identifier,
        (c) storing at the primary transceiver the secondary transceiver identifier of the responding secondary transceiver, and
        (d) repeating steps (b) and (c) for each of the secondary transceivers;
    to thereby facilitate class-based communication with the population of transceivers.

2. A method in accordance with claim 1, further comprising:
    establishing a network link between an asset tracking application and the primary transceiver;
    receiving a message from the asset tracking application at the primary transceiver, the message including one or more packets having a preamble that includes a target class identifier representing the class designation; and
    retransmitting the message from the primary transceiver for receipt by the secondary transceivers.

3. The method of claim 2, further comprising:
    providing a network interface module (NIM) in communication with the asset tracking application; and
    establishing a communication link between the NIM and the primary transceiver based on the class designation of the primary transceiver, thereby enabling the asset tracking application to communicate selectively with the population of transceivers based on its assigned class designation.

4. The method of claim 1 in which assigning the class designation to the population of transceivers comprises, for each of the transceivers:
    placing a plurality of radio frequency transponders (RFTs) in proximity to the transceiver, each of the RFTs including a preset class designation;
    reading, at the transceiver, the preset class designations of at least a portion of the RFTs in proximity to said transceiver; and
    assigning the class designation to the transceiver based on the preset class designations read by said transceiver.

5. The method of claim 1 in which assigning the class designation to the population of transceivers comprises, for each of the transceivers:
    providing an interrogator module including a interrogator interface and an interrogator transmission module;
    manually activating the interrogator module via the interrogator interface, the interrogator transmission module responsive to the manual activation to send a configuration command to the transceiver, the configuration command including the class designation;
    receiving the configuration command at the transceiver; and
    assigning the class designation to the transceiver based on the configuration command received.

6. The method of claim 1 in which the forming of the class-based hierarchical network includes promoting one of the secondary transceivers and propagating an additional hierarchical level of the network from the promoted secondary transceiver.

7. The method of claim 1, further comprising:
    assigning an abstracted class designation to a second population of transceivers, the abstracted class designation representing a common characteristic or behavior of the articles associated with the first and second populations of transceivers, the abstracted class designation being a meta-class of the class designation of the primary transceiver;
    abstracting the class designation of the primary transceiver; and
    establishing a network link between the primary transceiver and one or more of the second population of transceivers.

8. The method of claim 1 in which the class designation includes a privilege level of the transceiver.

9. An ad hoc network organization routine operable on a transceiver to automatically form with multiple peer transceivers the class-based hierarchical network in accordance with the method of claim 1, in the absence of centralized control.

10. An ad hoc network formed in accordance with the method of claim 1.

11. The ad hoc network of claim 10, further comprising a network interface module (NIM) in communication with the transceivers and an external computer network to facilitate communication between the transceivers and the external computer network.

12. An asset tracking system including the ad hoc network of claim 10 and a computer-operable asset tracking application in communication with the ad hoc network for querying the transceivers of the ad hoc network.

13. The asset tracking system of claim 12, further comprising a handheld interrogator module adapted for operating the asset tracking application, and for querying one or more of the transceivers of the ad hoc network, selectively, on the basis of the transceivers' class designations.

14. A dynamic distributed hierarchical database system formed in accordance with the method of claim 1.

15. The database system of claim 14, further comprising a computer-operable asset tracking application for sending a class-directed database command to one or more of the transceivers, the class-directed database command including an address representative of the class designation, and in which each transceiver of the class-based hierarchical network includes:
   a read/write memory for storing a profile representative of the class designation; and
   a handling routine for interpreting and responding to the class-directed database command received from the asset tracking application.

16. The database system of claim 15 in which:
   the class-directed database command includes a data query; and
   the handling routine of each transceiver includes a query handling routine for transmitting at least a portion of said transceiver's profile to the asset tracking application in response to receipt of the data query.

17. The database system of claim 15 in which:
   the class-directed database command includes a data update command; and
   the handling routine of each transceiver includes a data update routine for changing at least a portion of said transceiver's profile in the read/write memory, in response to receipt of the data update command.

18. The database system of claim 15 in which the address of the class-directed database command includes a wildcard to thereby direct the class-directed database command to any subclasses of the class designation.

19. A method of forming a wireless data communication network amongst a plurality of transceivers for tracking articles associated with the transceivers, comprising:
   assigning a first class designation to a first population of transceivers based on a first common characteristic or behavior of the articles associated with the first population of transceivers;
   assigning a second class designation to a second population of transceivers based on a second common characteristic or behavior of the articles associated with the second population of transceivers; and
   propagating a first and second class-based hierarchical communication networks for transmitting data amongst the respective first and second populations of transceivers based on their respective class designations, the first hierarchical communication network including a first root primary transceiver, and the second hierarchical communication network including a second root primary transceiver.

20. The method of claim 19, in which:
   the propagating of each of the first and second hierarchical class-based communication networks includes operating at each transceiver a network organization routine,
   the network organization routines of each of the first population of transceivers cooperating with the network organization routines of at least some of the others of the first population of transceivers to thereby automatically form the network amongst the first population of transceivers, and
   the network organization routines of each of the second population of transceivers cooperating with the network organization routines of at least some of the others of the second population of transceivers to thereby automatically form the network amongst the second population of transceivers.

21. A method in accordance with claim 19, further comprising:
   providing an asset tracking application;
   establishing a first network link between the asset tracking application and the first root primary transceiver;
   establishing a second network link between the asset tracking application and the second root primary transceiver; and
   selectively transmitting a message from the asset tracking application to the first hierarchical network, the message including one or more packets having a preamble that includes a target class identifier representing the first class designation.

22. The method of claim 21, further comprising:
   providing a network interface module (NIM) in communication with the asset tracking application;
   establishing a first communication link between the NIM and the first root primary transceiver, based on the first class designation; and
   establishing a second communication link between the NIM and the second root primary transceiver, thereby enabling the asset tracking application to communicate selectively with the first and second populations of transceivers.

23. The method of claim 19 in which assigning the first and second class designations to the respective first and second populations of transceivers comprises, for each of the transceivers:
   placing a plurality of radio frequency transponders (RFTs) in proximity to the transceiver, each of the RFTs including a preset class designation; and
   reading, at the transceiver, the preset class designations of at least a portion of the RFTs in proximity to said transceiver.

24. The method of claim 19 in which assigning the first and second class designations to the respective first and second populations of transceivers comprises, for each of the transceivers:
   providing an interrogator module including a interrogator interface and an interrogator transmission module;
   manually activating the interrogator module via the interrogator interface, the interrogator transmission module responsive to the manual activation to send a configuration command to the transceiver, the configuration command including one of the first and second class designations;
   receiving the configuration command at the transceiver; and assigning said one of the first and second class designations to the transceiver based on the configuration command received.

25. The method of claim 19 in which the forming of at least one of the first and second class-based hierarchical communication networks includes promoting one of the transceivers and propagating an additional hierarchical level of the network from the promoted transceiver.

26. The method of claim 19 in which, the second class designation is an abstraction of the first class designation and represents a common characteristic or behavior of the articles associated with the first and second populations of transceivers, and further comprising:

abstracting the first class designation of the first root primary transceiver; and establishing a network link between the first root primary transceiver and one or more of the second population of transceivers.

27. The method of claim 19 in which one or more of the first and second class designations includes a privilege level.

28. An ad hoc network organization routine operable on a transceiver to automatically form with multiple peer transceivers the first and second class-based hierarchical networks in accordance with the method of claim 19, in the absence of centralized control.

29. An ad hoc network formed in accordance with the method of claim 19.

30. The ad hoc network of claim 29, further comprising a network interface module (NIM) in communication with the first and second root primary transceivers and an external computer network to facilitate communication between the first and second class-based hierarchical networks and the external computer network.

31. An asset tracking system including the ad hoc network of claim 29 and a computer-operable asset tracking application in communication with the ad hoc network for querying the transceivers of the ad hoc network.

32. The asset tracking system of claim 31, further comprising a handheld interrogator module adapted for operating the asset tracking application, and for querying one or more of the transceivers of the ad hoc network, selectively, on the basis of the transceivers' class designations.

33. A dynamic distributed hierarchical database system formed in accordance with the method of claim 19.

34. The database system of claim 33, further comprising a computer-operable asset tracking application for sending a class-directed database command to one or more of the transceivers, the class-directed database command including an address representative of a selected one of the first and second class designations, and in which each transceiver of the first and second class-based hierarchical networks includes:

a read/write memory for storing a profile representative of the transceiver's assigned class designation; and a handling routine for receiving, interpreting, and responding to class-directed database commands when the address of the class-directed database command corresponds to the transceiver's assigned class designation.

35. The database system of claim 34 in which:

the class-directed database command includes a data query; and the handling routine of each transceiver includes a query handling routine for transmitting at least a portion of said transceiver's profile to the asset tracking application in response to receipt of the data query.

36. The database system of claim 34 in which:

the class-directed database command includes a data update command; and the handling routine of each transceiver includes a data update routine for changing at least a portion of said transceiver's profile in the read/write memory, in response to receipt of the data update command.

37. The database system of claim 34 in which the address of the class-directed database command includes a wildcard, to thereby direct the class-directed database command to all subclasses of the selected one of the first and second class designations.

38. A method of forming a hierarchical ad hoc network for use in tracking articles, comprising:

identifying a first class of the articles having a first common characteristic or behavior;

identifying a second class of the articles having a second common characteristic or behavior;

associating a wireless transceiver with each of the articles of the first and second classes of articles, each of the wireless transceivers including a digital processor, a memory, and a network organization routine operable on the digital processor;

selecting a first class designation representative of the first class of articles and a second class designation representative of the second class of articles;

storing a first class designation in the memories of each of the wireless transceivers associated with the first class of articles;

storing a second class designation in the memories of each of the wireless transceivers associated with the second class of articles; and initiating the network organization routines of the wireless transceivers to automatically propagate, in the absence of central control, a first hierarchical ad hoc network amongst the wireless transceivers of the first class and a second hierarchical ad hoc network amongst the wireless transceivers of the second class, the first hierarchical network being automatically organized so that it is logically distinct from the second hierarchical network.

39. The method of claim 38 in which the first class of articles includes a subclass of articles sharing a third common characteristic or behavior.

40. A portable network device adapted for attachment to one of multiple peer articles having a common characteristic or behavior, comprising:

a wireless transceiver;

a digital information processor in communication with the wireless transceiver;

a power source for providing electrical power to the wireless transceiver and the digital information processor;

a memory unit in communication with the digital information processor, the memory unit adapted to store a class designation representative of the common characteristic or behavior; and a network organization routine operable on the digital information processor to form a network link selectively with one of multiple peer devices attached to other peer articles and including a peer designation representing the common characteristic or behavior of the peer articles, the network organization routine operable to send network organization messages including the class designation and to receive network organization requests from the peer devices, to thereby selectively propagate a class-based hierarchical ad hoc network among the network device and the peer devices for tracking the peer articles.

41. The device of claim 40 in which the memory unit is a read/write memory unit.

42. A dynamic distributed hierarchical database system for asset tracking, comprising:

a plurality of computer units each associated with at least one asset having a characteristic or behavior represented by a class designation, each computer unit including:

(a) a memory unit for storing a profile representative of the class designation;

(b) an ad hoc network organization routine in communication with the memory for establishing a hierarchical network with other computer units based on the class designation; and (c) a query handling routine for interpreting and responding to database queries received from an asset tracking application that correspond to the class designation.

43. The database system of claim 42 in which the memory unit includes a read/write memory unit.

* * * * *